49-420

Nov. 11, 1952 | H. J. KLEIN | Re. 23,576

SLIDING PANEL | Orig. 2553,459

Original Filed March 28, 1950 | 2 SHEETS—SHEET 1

INVENTOR

Hyman J. Klein

Hyman J. Klein
INVENTOR

Reissued Nov. 11, 1952

Re. 23,576

UNITED STATES PATENT OFFICE 23,576

SLIDING PANEL

Hyman J. Klein, Closter, N. J., assignor to Sidney Sarner, Tenafly, N. J.

Original No. 2,553,459, dated May 15, 1951, Serial No. 152,344, March 28, 1950. Application for reissue May 6, 1952, Serial No. 287,299

9 Claims. (Cl. 20—19)

Matter enclosed in heavy brackets [ ] appears in the original patent but forms no part of this reissue specification; matter printed in italics indicates the additions made by reissue.

This invention relates to sliding panels, particularly sliding doors, and to means for supporting and guiding the same.

In order to save space, provide for improved appearances and decorative possibilities through the elimination of unsightly door knobs, and for various other reasons, constantly increasing use is being made of doors of the sliding type as compared with hinged-type doors. Such use has up to the present been subject to various objections which have prevented the attainment of all the advantages inherent in closures of the sliding panel type. Thus, previously employed sliding panels have been prone to become disengaged from their tracks, or move too sluggishly or completely bind therein. In many instances, unsightly openings are left at the vertical and horizontal edges between panel and frame. All or part of these defects have been caused by the fact that in many cases, the frames do not lie in a vertical plane and/or the vertical and horizontal edges of the frames are not respectively parallel and/or truly vertical or level. Further, in many installations reversal of the panel through 180° about its vertical or horizontal axis to minimize the aforementioned defects or to present an undamaged or improved outwardly appearance has been made impossible because of the particular guide means employed and/or the manner of installation. These same deflections have likewise prevented use of the sliding panel as a partition between two enclosures requiring equally unblemished appearances from both sides.

One object of this invention is to provide novel guide means for a sliding panel which will automatically compensate for any lack of parallelism between the upper and lower edges of the frame therefor.

Another object is to provide novel guide means for a sliding panel which may be so adjusted that the proper compressive force is exerted against the upper and lower edges of the frames therefor to promote facility in installation and removal and to eliminate possibilities of side sway, rattling and disengagement from insufficient compressive force and binding from excessive force.

A further object is to provide novel adjusting means whereby a sliding panel may be tilted in its own vertical plane to compensate for any lack of perpendicularity of the side frames against which the vertical edges of the panel abut.

A still further object is to provide novel guide means for sliding panels which may be so installed as to be imperceptible from either side and at the same time permit ready reversal of the panel through 180° about its horizontal or vertical axis.

Other objects and advantages will appear from the following detailed description of a preferred embodiment of the invention illustrated in the accompanying drawings, in which.

Figure 1:
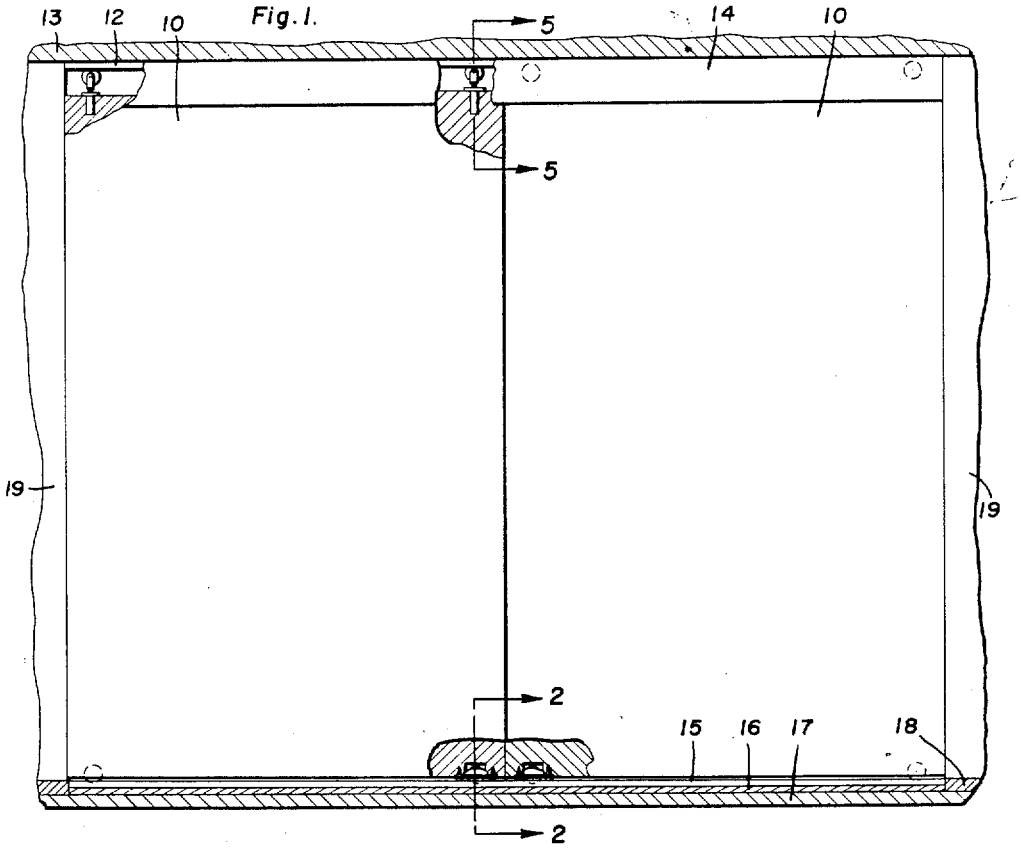
Fig. 1 is a front elevation of two sliding panels partially cut away to show the guide means.
Figure 2:
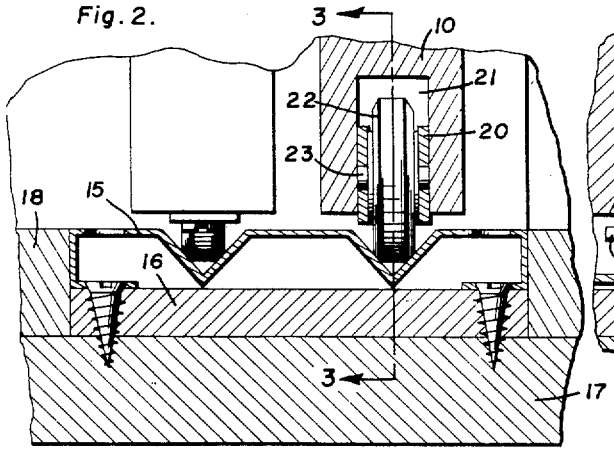
Fig. 2 is an enlarged sectional view on line 2—2 of Fig. 1.
Figure 5:
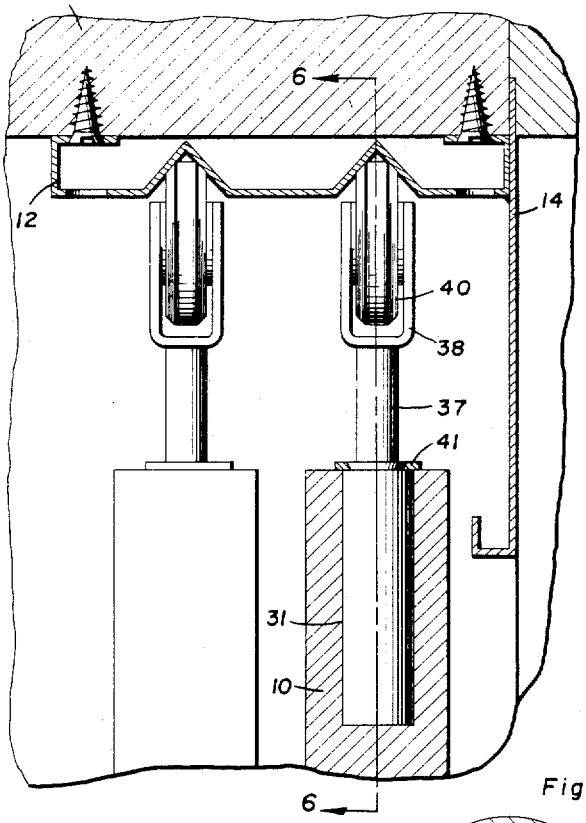
Fig. 5 is an enlarged sectional view on line 5—5 of Fig. 1.

Referring now to the drawings, numeral 10 indicates sliding panels into the top and bottom edges of which my improved guiding means are inserted. The upper guide means, as shown in Fig. 5, move in an upper trackway 12 fastened to the upper support or frame 13, which means are concealed from view by a valance 14 to produce a more pleasing appearance. The lower guide means, as shown in Fig. 2, move in a lower trackway 15 fastened to the bottom support or still 16 and/or underfloor 17 and preferably flush with the finished floor 18 so as to provide an unobstructed surface. As shown in Fig. 1, the panels 10 abut at their sides against side frames 19, although it is obvious that the panels may be of the "disappearing" type without departing from the scope of the invention.

Figure 3:
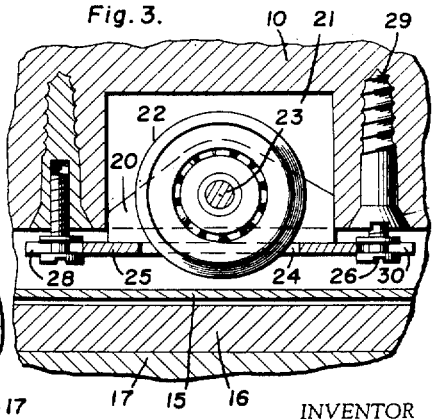
Fig. 3 is a partial sectional view on line 3—3 of Fig. 2 showing one of the inserts and adjusting bolts in elevation.
Figure 4:
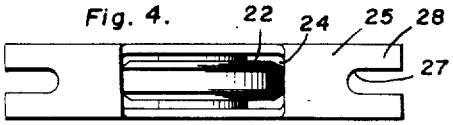
Fig. 4 is a bottom plan view of the embodiment shown in Fig. 3.

The lower guide means, as shown in Figs. 2, 3 and 4, comprise a channel shaped member, the upturned flanges 20 of which lie in a recess 21 in the bottom edge of the panel deep enough to permit the free movement therein of a wheel or roller 22 rotatably mounted on a rivet, pin or axle 23 passing transversely through the said flanges. The rim of the wheel passes through an opening 24 in the web 25 of said channel shaped member so as to engage the bottom trackway. The channel shaped member is adjustably secured to the bottom edge of the panel by means of bolts 26 passing through openings 27 in web extensions 28 and engaging internally threaded inserts 29 in the bottom edge of the panel. Adjustability of the wheel assembly is obtained by employing a bolt with a fixed collar or circular flange 30 whereby the web extensions 28 float between the bolt head and said collar.

Figure 6:
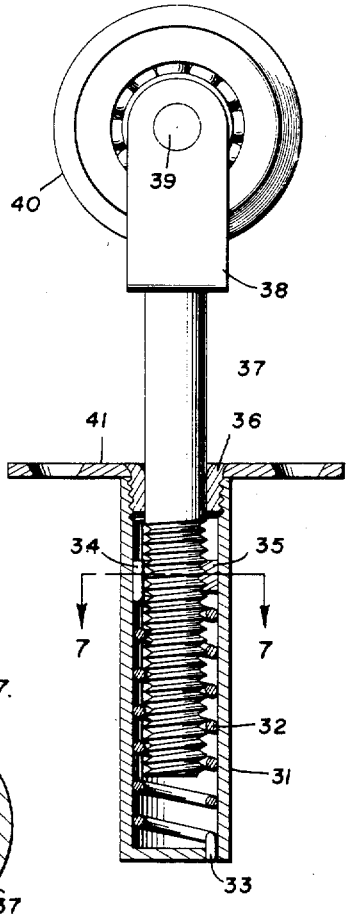
Fig. 6 is an enlarged sectional view on line 6—6 of Fig. 5 showing the wheel, yoke and spindle in elevation.
Figure 7:
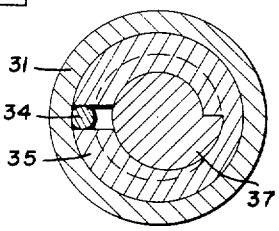
Fig. 7 is an enlarged sectional view on line 7—7 of Fig. 6.
Figure 8:
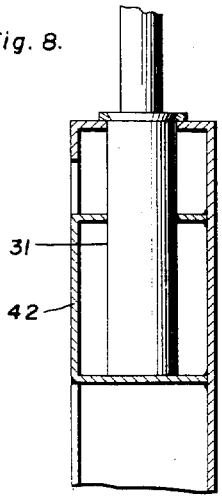
Fig. 8 is a partial section showing a modified form of mounting for hollow panels.
Figure 9:
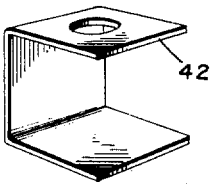
Fig. 9 is a perspective view of the U-shaped bracket of Fig. 8.

The upper guide means, as shown in Figs. 5, 6 and 7 is a spring-biased adjustable wheel assembly which comprises a socket, tube, casing or cylinder 31 containing a compression spring 32 fixed at its lower end 33 to the socket and at its upper end 34 to a slotted internally threaded sleeve, collar or stop nut 35 whereby said spring exerts force on said sleeve in an outward axial direction while preventing it from rotating when spindle 37 is threaded therethrough. Said sleeve 35 is slidable in the socket and is prevented from sliding out therefrom by a cylindrical escutcheon base plate plug 36. Said spindle or stud bolt 37 is threaded at its lower end to thereby engage the sliding sleeve 35. This spindle is slidable in the plug 36 so that it is capable of both axial and rotational motion in the socket. The upper end of the spindle is fixed to a yoke or clevis 38 in which is mounted a rivet, pin or axle 39 upon which the wheel or roller 40 rotates. The assembly is recessed in the upper edge of the panel 10 and fixed thereto by means of the mounting or escutcheon base plate 41. Where the panel is hollow, the sole use of an escutcheon base plate for mounting the assembly is insufficient, and in such case a U-shaped member 42 may be inserted in the panel as shown in Figs. 8 and 9. This U-shaped member is mounted at a proper distance below the top edge of the panel and welded or otherwise fastened thereto so that when installed for use, said socket passes through the opening in the upper arm of said U-shaped member and rests upon the lower arm thereof.

It will of course be understood that other means for mounting or recessing the spring-biased guide assembly at the upper edge of the panel may be availed of. Thus, in the case of a hollow metal panel, instead of inserting the socket into the top edge of the panel, the socket may be directly fastened to the inside wall of the panel at such a distance below said edge that the upper periphery of the roller is the only part of the guide assembly that extends above said edge for engaging the upper trackway. This manner of mounting is advantageous in that said assembly is almost entirely hidden, the panel wall acting as its own valance. In this case, the escutcheon base plate is superfluous, the U-shaped member may be dispensed with, and the socket fastened to the inside wall of the panel by means of metal straps, welding, or the like. A preferred means for so installing the spring-biased guide assembly involves the use of mounting flanges at upper and lower ends of the socket or extending the entire length thereof and in a plane parallel to that of the panel, whereby the flanges may be fastened to the panel by bolting, riveting, welding or the like. These flanges may be welded or otherwise fastened to the socket or they may be made integral therewith by bending the socket from a sheet of metal wider than the circumference of the socket and folding back the excess metal in a plane tangential at the seam running the length of the socket. Or the excess metal may be so folded as to form flanges in a plane parallel to said tangential plane but spaced therefrom so that the socket will be mounted further away from the inside wall of the panel.

In putting my improved panel and guide means into use, no particular preparations are necessary for aligning panel and frame and similar expensive and time-consuming operations. The upper spring-biased guide assembly is placed in the upper trackway, and by pressing upwards slightly to compress the springs, the bottom wheel assembly may be quickly placed in position in the lower trackway. The panel will thereafter automatically adjust itself to any lack of parallelism between the upper and lower trackways. Lack of perpendicularity of the abutting side frames, with resulting unsightly cracks and openings, may be readily compensated for by simply raising or lowering the wheel assembly under one or the other side of the panel whereby the panel will be tilted in its own vertical plane to a position in which better contact is had with the abutting side frames. Since the spring-biased guide means may be adjusted in length by simply screwing the spindle into or out of the socket, the compressive force exerted against the trackways may be altered at any time to provide a panel which will slide quickly, easily and noiselessly. Thus, looseness in the trackways with resulting rattling, sidesway and disengagement may be readily eliminated by unscrewing the spindles farther out of the sockets whereby the compressive force against the trackways is increased. Similarly, binding and sluggishness in the trackways caused by tightness may be readily eliminated by screwing the spindles farther into the sockets. Because the upper and lower guide means are edge-recessed so that they cannot be seen from either side, the improved panels of my invention may be used to partition any space where an equally good appearance on both sides is necessary. Likewise, where as in closet closures the outer side becomes dirty and damaged through use, the panel may be readily taken out and rotated 180° about its vertical or even horizontal axis. This rotation may also be desirable or necessary in some cases to mitigate frame and floor construction defects, panel warping and the like.

While I have shown and described a preferred embodiment of my invention, it will be understood that it is not to be limited to all of the details shown, since certain changes and modifications readily apparent to those skilled in the art may be made therein without departing from the essence of my invention. Such changes and modifications are to be regarded as within the purview of this application and the spirit and scope of the appended claims.

I claim:

1. A sliding panel comprising a plurality of spring-biased adjustable wheel assemblies mounted at one edge of said panel comprising a socket fixedly recessed in said edge of the panel, a spindle having a threaded end co-axially mounted in said socket member, an internally threaded sleeve member confined and slidable in said socket and mounted on the threaded portion of said spindle, a compression coil spring whose diameter is substantially the same as that of said sleeve member and attached at one end to said socket and at the other end to said sleeve member, whereby to exert force on said sleeve member in an outward axial direction while preventing it from rotating when said spindle is threaded therethrough, and a wheel mounted at the free end of the spindle adapted to engage a trackway, a plurality of springless wheel assemblies mounted at the opposite edge of the panel adapted to engage a second trackway, and means to raise and lower each of the springless wheel assemblies mounted at said opposite edge whereby the panel may be caused to tilt in a vertical plane.

2. A sliding panel comprising a plurality of spring-biased adjustable guide means mounted at one edge of said panel comprising a socket member fixedly recessed in said edge of the panel, a spindle having a threaded end co-axially mounted in said socket member, an internally threaded sleeve member confined and slidable in said socket member and mounted on the threaded portion of said spindle, a compression coil spring whose diameter is substantially the same as that of said sleeve member and attached at one end to said socket member and at the other end to said sleeve member whereby to exert force on said sleeve member in an outward axial direction while preventing it from rotating when said spindle is threaded therethrough, and guide means mounted at the free end of said spindle adapted to engage a trackway, recesses in the opposite edge of said panel, each of said recesses having mounted therein a springless wheel assembly comprising a channel member having a pin mounted transversely through the upwardly turned flanges thereof and parallel to the bottom web thereof, a wheel mounted rotatably on the pin and passing through an opening in the web for engaging a second trackway, openings in each end of the web, and adjustable bolt means passing through said openings and engaging said opposite edge of the sliding panel whereby the wheel assemblies mounted at said opposite edge may be raised and lowered.

3. A sliding panel comprising a plurality of spring-biased guide means mounted at one edge of said panel adapted to engage a trackway, recesses in the opposite edge of said panel, each of said recesses having mounted therein a springless wheel assembly, a channel member having a pin mounted transversely through the upwardly turned flanges thereof and parallel to the bottom web thereof, a wheel mounted rotatably on the pin and passing through an opening in the web for engaging a second trackway, openings in each end of the web, and adjustable bolt means passing through said openings and engaging said opposite edge of the sliding panel whereby the wheel assemblies mounted at said opposite edge may be raised and lowered.

4. A spring-biased adjustable guide assembly adapted for use in a sliding panel comprising a socket member, a spindle having a threaded end co-axially mounted in said socket member, an internally threaded sleeve member confined and slidable in said socket member and mounted on the threaded portion of said spindle, a compression coil spring whose diameter is substantially the same as that of said sleeve member and attached at one end to said socket member and at the other end to said sleeve member whereby to exert force on said sleeve member in an outward axial direction while preventing it from rotating when said spindle is threaded therethrough, means for fastening said socket member to the panel, and guide means mounted at the free end of said spindle adapted to engage a trackway.

5. A spring-biased adjustable wheel assembly adapted for use in a sliding panel comprising a socket member, an internally threaded sleeve member slidable therein, a compression coil spring whose diameter is substantially the same as that of said sleeve member and attached at one end to said socket member and at the other end to said sleeve member whereby to exert force on said sleeve member in an outward axial direction while preventing it from rotating when the spindle hereinafter set forth is threaded therethrough, a cylindrical plug mounted at the open end of said socket member serving to confine the sleeve member in the socket member against the compressive force of the spring, a spindle one end of which is threaded and passes slidably through said plug to engage said internally threaded sleeve member, the other end of the spindle being rigidly attached to a yoke, pin and wheel unit, and a mounting plate lying in a plane perpendicular to the longitudinal axis of said socket member and attached thereto at the plug end thereof.

6. A spring-biased adjustable wheel assembly adapted for use in a sliding panel comprising a socket member, an internally threaded sleeve member slidable therein, a compression coil spring whose diameter is substantially the same as that of said sleeve member and attached at one end to said socket member and at the other end to said sleeve member whereby to exert force on said sleeve member in an outward axial direction while preventing it from rotating when the spindle hereinafter set forth is threaded therethrough, a cylindrical plug mounted at the open end of said socket member serving to confine the sleeve member in the socket member against the compressive force of the spring, a spindle one end of which is threaded and passes slidably through said plug to engage said internally threaded sleeve member, the other end of the spindle being rigidly attached to a yoke, pin and wheel unit, and mounting flanges attached to the periphery of said socket member and lying in a plane tangential thereto.

7. A sliding panel comprising a plurality of spring-biased adjustable wheel assemblies mounted at one edge of said panel comprising a socket fixedly recessed in said edge of the panel, a spindle having a threaded end co-axially mounted in said socket member, an internally threaded sleeve member confined and slidable in said socket and mounted on the threaded portion of said spindle, a spring adapted to exert force on said sleeve member in an outward axial direction, and a wheel mounted at the free end of the spindle adapted to engage a trackway, a plurality of springless wheel assemblies mounted at the opposite edge of the panel adapted to engage a second trackway, and means secured to said opposite edge of the panel to raise and lower each of the springless wheel assemblies mounted at said opposite edge whereby the panel may be caused to tilt in a vertical plane.

*8. A spring biased adjustable wheel assembly for use in a sliding panel comprising a socket member, an internally threaded sleeve member whose outside diameter is substantially the same as the inside diameter of said socket member and slidable therein, a compression coil spring whose diameter is substantially the same as that of said sleeve member disposed within said socket member with one end pressing against the closed end of said socket member and the other end pressing against said sleeve member, a cylindrical plug mounted at the open end of said socket member serving to confine the sleeve member in the socket member against the compressive force of the spring, a spindle one end of which is threaded and passes slidably through said plug to engage said internally threaded sleeve member, and a yoke, pin and wheel unit rigidly attached to the*

*other end of said spindle, and a mounting plate lying in a plane perpendicular to the longitudinal axis of said socket member and attached thereto at the plug end thereof.*

*9. A spring biased adjustable wheel assembly adapted for use in a sliding panel comprising a socket member, an internally threaded sleeve member whose outside diameter is substantially the same as the inside diameter of said socket member and slidable therein, a compression coil spring coaxially disposed within said socket member and having a diameter substantially equal to that of said sleeve member, one end of said spring contacting the closed end of said socket member and the other end contacting and urging said sleeve member towards the open end of said socket member, hollow plug means at the open end of said socket member for limiting the axial movement of said sleeve member against the bias of said spring, a spindle having a threaded portion extending inwardly into said socket member through said plug means and engaging said internally threaded sleeve member, the other end of said spindle extending outwardly of said socket member and a yoke, pin and wheel unit rigidly attached to the outwardly extending end of said*

*spindle, and mounting flanges at the open end of said socket member and located in a plane at right angles to the axis of said socket member, said plug means engaging said flanges.*

HYMAN J. KLEIN.

REFERENCES CITED

The following references are of record in the file of this patent or the original patent:

UNITED STATES PATENTS

| Number | Name | Date |
|---|---|---|
| 90,193 | Prudhomme et al. | May 18, 1869 |
| 207,120 | Hunt | Aug. 20, 1878 |
| 595,505 | Wesling | Dec. 14, 1897 |
| 657,488 | Gulick | Sept. 4, 1900 |
| 681,379 | Tidd | Aug. 27, 1901 |
| 1,356,685 | Allmand | Oct. 26, 1920 |
| 1,448,845 | Johnson et al. | Mar. 20, 1923 |
| 1,640,143 | Corcoran | Aug. 23, 1927 |
| 2,347,524 | Swan | Apr. 25, 1944 |
| 2,581,606 | Seaman et al. | Jan. 8, 1952 |

FOREIGN PATENTS

| Number | Country | Date |
|---|---|---|
| 468,220 | Great Britain | June 30, 1937 |